United States Patent
Lane et al.

(10) Patent No.: US 7,339,460 B2
(45) Date of Patent: Mar. 4, 2008

(54) METHOD AND APPARATUS FOR DETECTING CARGO STATE IN A DELIVERY VEHICLE

(75) Inventors: Richard D. Lane, San Diego, CA (US); William Peckham, San Diego, CA (US); Mark D. Parisi, San Diego, CA (US); Mark Doyle, San Diego, CA (US); Ken Oertle, San Diego, CA (US); Charles Pedersen, San Diego, CA (US); Bratislav Matic, San Diego, CA (US); William Hugh Molesworth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/070,762

(22) Filed: Mar. 2, 2005

(65) Prior Publication Data

US 2006/0202809 A1    Sep. 14, 2006

(51) Int. Cl.
B60Q 1/00 (2006.01)
B60K 28/00 (2006.01)

(52) U.S. Cl. .............. 340/438; 340/425.5; 340/441; 180/290; 235/384

(58) Field of Classification Search .............. 340/438; 180/290
See application file for complete search history.

(56) References Cited

U.S. PATENT DOCUMENTS

| | | | | |
|---|---|---|---|---|
| 5,491,486 | A | * | 2/1996 | Welles et al. ........... 342/357.07 |
| 5,907,286 | A | * | 5/1999 | Kuma ........................ 340/5.5 |
| 6,236,911 | B1 | * | 5/2001 | Kruger ......................... 701/1 |
| 6,266,008 | B1 | * | 7/2001 | Huston et al. ......... 342/357.09 |

* cited by examiner

Primary Examiner—Donnie L. Crosland
(74) Attorney, Agent, or Firm—Richard A. Bachand; Thomas Rouse

(57) ABSTRACT

Method and apparatus for detecting cargo state in a delivery vehicle. A method is provided for determining a cargo state in a delivery vehicle. The method includes sensing a cargo state change, and determining whether or not the delivery vehicle is in motion. The method also includes storing the cargo state change if it is determined that the delivery vehicle is not in motion.

33 Claims, 4 Drawing Sheets

METHOD AND APPARATUS FOR DETECTING CARGO STATE IN A DELIVERY VEHICLE

BACKGROUND

I. Field

The present invention relates generally to transportation and delivery systems, and more particularly, to methods and apparatus for detecting a cargo state in a delivery vehicle.

II. Description of the Related Art

Advances in technology have provided for increased automation in many industries. For example, in the shipping industry, technology has allowed for the shipment and delivery of cargo virtually around the clock. Delivery vehicles now carry and deliver cargo to all parts of the country. For example, in the trucking industry, cargo-carrying tractor-trailers may be driven hundreds or thousands of miles to reach a delivery site. In some cases, a delivery vehicle may make several intermediate stops before reaching its final destination. Thus, it is important to efficiently route delivery vehicles to avoid transporting empty vehicles that may result in revenue losses for the vehicle owners.

Typically, cargo is loaded into a trailer portion of a tractor-trailer delivery vehicle and driven from point to point along a delivery route by a vehicle operator. Along the delivery route, intermediate stops may occur where portions of the cargo are unloaded for delivery or where new cargo is picked up. To facilitate efficient routing, sometimes a trailer is detached from its current tractor and left at a designated location for pickup by another tractor. The trailer may sit at this intermediate location for various lengths of time while waiting to be retrieved by another tractor. This detachable trailer arrangement allows shippers to plan the most efficient and cost effective routes for the delivery of the cargo. In some cases, the trailer acts as a storage container to store cargo for an extended period of time or to allow cargo to be transported via railways.

One problem associated with the delivery of cargo is that it is difficult to accurately determine the cargo state of the trailer portion of a delivery vehicle at any given time. The cargo state indicates whether the trailer is empty or whether the trailer is loaded (i.e., currently contains cargo). The cargo state can be used for several purposes. For example, in one case, the cargo state can be used to determine that the vehicle operator failed to deliver or pickup cargo. In another case, the cargo state can be used to determine that the vehicle operator delivered cargo to the wrong location. Thus, being able to accurately determine the cargo state of a delivery vehicle has become a very important requirement for the shipping industry.

Unfortunately, conventional systems sometimes operate to provide false or inaccurate cargo state readings. For example, temperature, noise, and/or the humidity of the trailer may cause the sensor that is used to measure the cargo state to produce inaccurate results. Additionally, the movement of the trailer, or shifting of the cargo within the trailer may also contribute to inaccurate readings.

Therefore, what is needed is a cargo detection system that operates to accurately detect the state of cargo in a delivery vehicle. The system should operate to overcome the problems associated with conventional systems to provide accurate cargo state information to the vehicle operator and/or remote stations.

SUMMARY

In one or more embodiments, a cargo detection system, comprising methods and apparatus, is provided that operates to accurately determine the cargo state of a delivery vehicle. For example, the system operates to overcome the problems of temperature, vehicle motion, and shifting cargo to provide accurate cargo state measurements. In one embodiment, when a change in cargo state is detected, the vehicle operator is notified. In another embodiment, a detected state change causes a message to be sent to a remote station. As a result, it is possible for personnel at the remote station to monitor the cargo state of the delivery vehicle as it proceeds along its delivery route. In one embodiment, the system operates to consume very little power so that it is suitable for operation over long periods using only battery power.

In one embodiment, a method is provided for determining a cargo state in a delivery vehicle. The method comprises sensing a cargo state change, and determining whether or not the delivery vehicle is in motion. The method also comprises storing the cargo state change if it is determined that the delivery vehicle is not in motion.

In another embodiment, a cargo detection system is provided for detecting a cargo state in a vehicle. The system comprises a sensor that operates to sense cargo in the vehicle and output a sensor signal, and motion detection logic that operates to determine whether or not the vehicle is in motion. The system also comprises cargo sensing logic that operates to sense a cargo state change based on the sensor signal, and store the cargo state change if the motion detection logic determines that the vehicle is in motion.

In another embodiment, apparatus is provided for determining a cargo state in a delivery vehicle. The apparatus comprises means sensing a cargo state change, and means for determining whether or not the delivery vehicle is in motion. The apparatus also comprises means for storing the cargo state change if it is determined that the delivery vehicle is not in motion.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes methods and apparatus for providing a cargo detection system to determine a cargo state in a delivery vehicle. It should also be understood that embodiments of the detection system could be used in conjunction with virtually any type of delivery vehicle including, but not limited to, trucks, buses, trains, aircraft, and automobiles.

Figure 1:
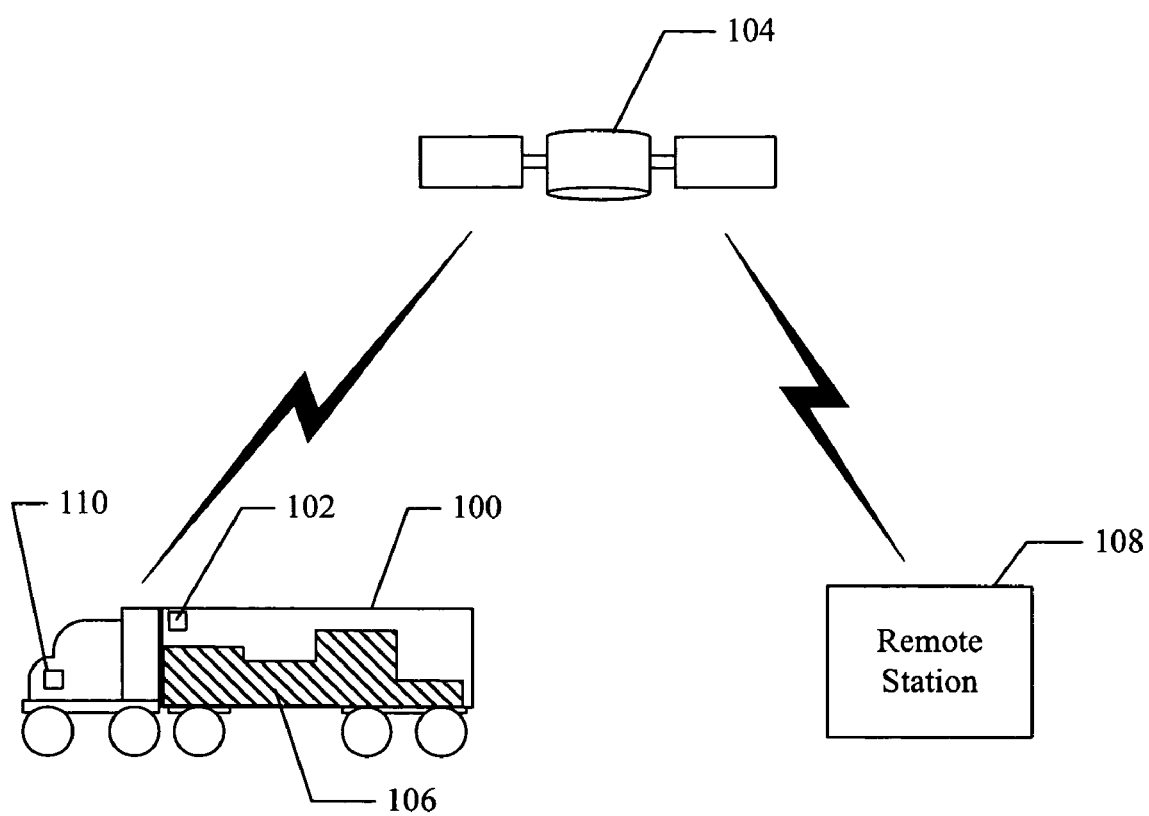
FIG. 1 shows a delivery vehicle that includes one embodiment of a cargo detection system.

FIG. 1 shows a delivery vehicle 100 that includes one embodiment of a cargo detection system. The vehicle 100 in this example comprises a tractor-trailer, commonly used in the long-haul trucking industry to transport goods from shippers to consignees. The vehicle 100 further comprises a mobile communication terminal. (MCT) 110 for communicating with one or more remote locations using a satellite-based wireless communication system and satellite 104. The communication system provides two-way communications between delivery vehicles and third parties, such as a fleet management center or dispatch center, family members, governmental authorities, consignees, shippers, or other remote stations. Generally, the MCT 110 resides onboard a tractor portion of the vehicle 100 so as to be easily accessible by the vehicle operator. The trailer portion of the vehicle 100 includes cargo 106 to be delivery to one or more delivery sites.

In one embodiment, a remote station 108 comprises a central processing center, otherwise known as a central station, hub, or network management center (NMC), and serves as a central communication point between MCT-equipped vehicles and their respective dispatch centers, other designated office(s), shippers, consignees, governmental authorities, family members, and so on.

The MCT 110 located on vehicle 100 transmits and receives wireless communications using the satellite-based wireless communication system to communicate with remote station 108. Other wireless systems could be used in addition or in the alternative, such as an analog or a digital cellular telephone system, an RF communication system, a wireless data communication network, such as a cellular digital packet data (CDPD) network, or 802.11 and/or Bluetooth technologies. Thus, it is possible for information determined by the cargo detection system to be transmitted to one or more entities using the satellite-based wireless communication system or suitable alternative system.

The vehicle 100 includes cargo detection system 102 that is located in the trailer portion of the vehicle. During operation, the detection system 102 operates to detect the cargo state of the trailer as the vehicle 100 proceeds along its delivery route. In one embodiment, the detection system 102 operates to notify the vehicle operator about the detected cargo state. In another embodiment, the detection system 102 operates to transmit information about the detected cargo state to the remote station 108 using the MCT 110. In still another embodiment, the detection system 102 operates to transmit information about the detected state to the remote station 108 using a self-contained transmitter. In this case, the detection system 102 operates whether or not the trailer is connected to the tractor portion of the vehicle. For example, the trailer may be loaded and transported on a railroad car. Thus, the detection system 102 operates to accurately detect whether or not cargo is loaded in the trailer portion of the vehicle and report this information to the vehicle operator and/or the remote station 108.

Figure 2:
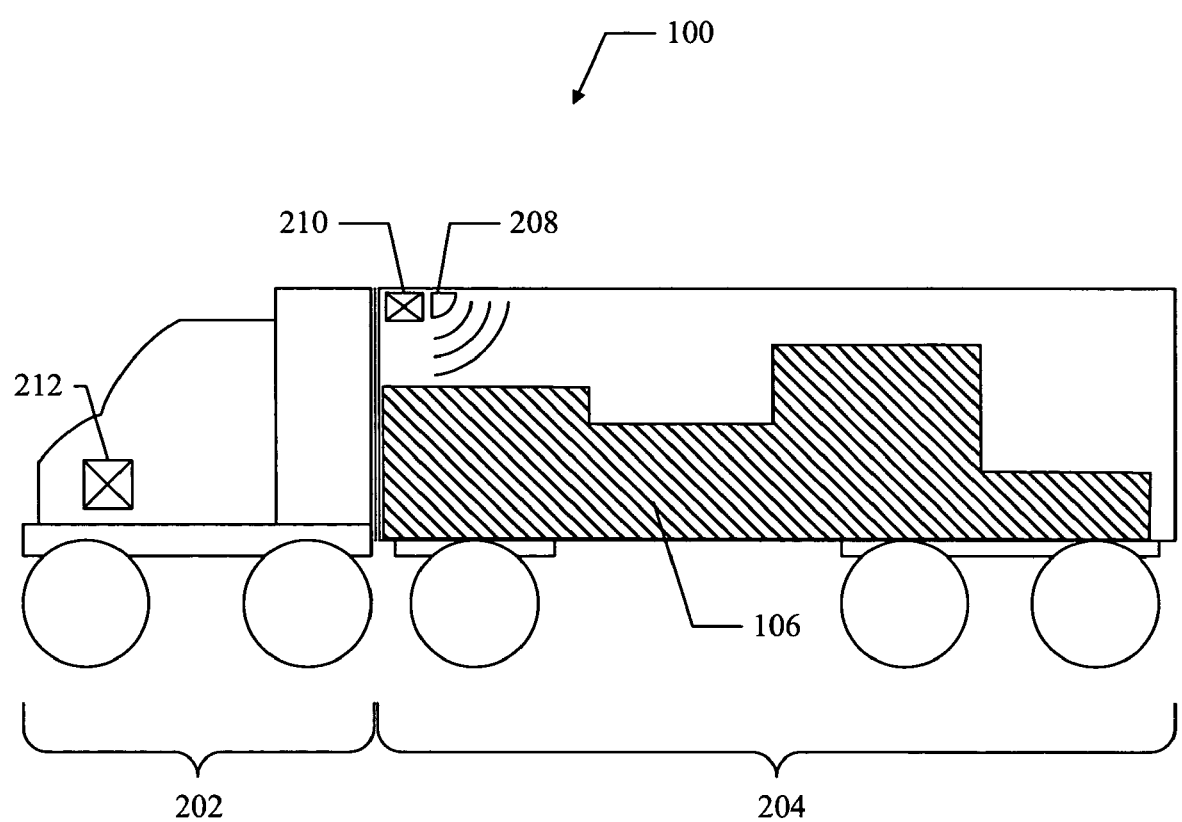
FIG. 2 shows a detailed diagram of a delivery vehicle that included one embodiment of a cargo detection system.

FIG. 2 shows a detailed diagram of the delivery vehicle 100 that includes one embodiment of a cargo detection system. The delivery vehicle 100 comprises a tractor portion 202 and a cargo-carrying trailer portion 204 that can be attached or detached as desired to facilitate efficient routing of the cargo 106. The trailer portion 204 includes one embodiment of the detection system 102 comprising a detection sensor 208 and detection logic 210 that operate to detect the cargo state of the trailer 204. For example, in one embodiment, the cargo state is a load characteristic of the trailer 204 that indicates whether the trailer 204 is empty or loaded. In other embodiments, the load characteristic is determined with greater accuracy; for example, a fill percentage of the trailer 204 may be determined. In one embodiment, the cargo load detection may be performed using RF identification (ID) technology.

In one embodiment, the sensor 208 comprises an ultrasonic sensor that operates to sense whether or not there is cargo in the trailer 204. However, virtually any type of sensor that senses the shape, size, position or other characteristics of the inside of the trailer is suitable for use with one or more embodiments of the cargo detection system.

In one embodiment, the detection logic 210 is located in the trailer portion 204 so that it may operate to determine the cargo state whether or not the trailer portion 204 is connected to the tractor portion 202. Thus, it is possible for the detection logic 210 to determine the state of the cargo 206 when the trailer portion 204 is waiting at a designated location for pickup by a tractor portion, or when the trailer portion 204 is being used as a storage container to store the cargo for an extended time period, or ship via railway. In this embodiment, the detection logic 210 comprises its own transceiver and power system to allow communication directly with a remote station over a wireless communication network and/or a wired communication link, such as an RS-232 or Ethernet connection.

In another embodiment, the detection logic 210 is located in the tractor portion 202 as shown at 212. In this embodiment, the detection logic 210 may be a stand-alone device or incorporated into an MCT that is included in the tractor portion. During operation, the detection logic 210 may communicate with a remote station via the MCT to provide cargo state information determined from the sensor 208. Thus, the detection logic 210 may be located at various locations within the delivery vehicle to provide cargo state information to the vehicle operator and/or a remote station.

Figure 3:
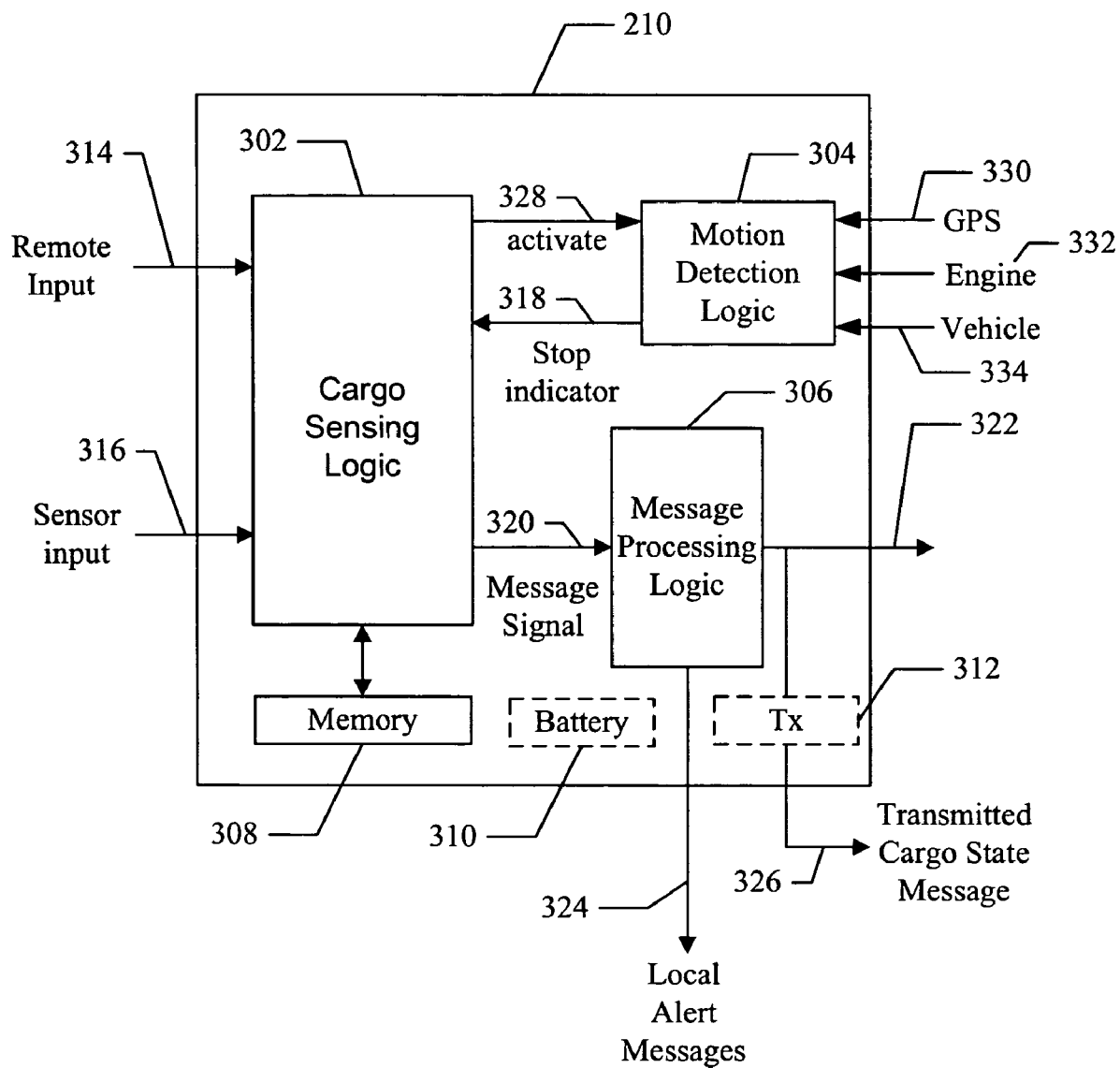
FIG. 3 shows a detailed diagram of one embodiment of a cargo detection system.

FIG. 3 shows a detailed diagram of one embodiment of the detection logic 210. The detection logic 210 comprises cargo sensing logic 302, motion detection logic 304, message processing logic 306, and memory 308. The detection logic 210 may also comprise an optional battery 310 and/or transmitter 312. The battery 310 and transmitter 312 allow the detection logic 210 to operate in a stand-alone mode to detect the cargo state and transmit information about the detected state to a remote station. For example, in one embodiment, the detection logic 210 is located in a detached trailer portion of a delivery vehicle. In this embodiment, the detection logic 210 continues to operate by supplying it own power and communication transmitter. Thus, it is possible for the detection logic 210 to detect cargo state in a stand-alone trailer.

The cargo sensing logic 302 may comprise a processor, CPU, gate array, logic, discrete circuitry, software, or any combination of hardware and software. The sensing logic 302 comprises logic to receive remote input 314 and sensor input 316. For example, the sensing logic 302 receives sensor input 316 from the sensor 208 shown in FIG. 2. In one embodiment, the cargo sensing logic 302 operates using very low power, because processing the sensor input 316 may be performed very efficiently.

In one embodiment, the remote input 314 comprises input from a vehicle operator using a local input device such as a keypad. In another embodiment, the remote input 314 delivers commands or instructions received over-the-air from a remote station. For example, instructions may be transmitted to the vehicle from a remote station and received by an MCT located at the vehicle. The commands are then input to the cargo sensing logic 302 via the input 314. Thus, commands and/or instructions may be input to the cargo sensing logic 302 from either a vehicle operator or from personnel at a remote station.

The motion detection logic 304 may comprise a processor, CPU, gate array, logic, discrete circuitry, software, or any combination of hardware and software. In one embodiment, the motion detection logic 304 includes active and standby modes. In the standby mode, the motion detection logic 304 operates to conserve power. In the active mode, the motion detection logic 304 operates to detect the motion of the vehicle. In one embodiment, the motion detection logic 304 includes logic to receive an activate signal 328 from the cargo sensing logic 302 that causes the motion detection logic 304 to go into either active or standby modes. For example, when the activate signal 328 is set to a particular state, it operates to activate the motion detection logic 304 to detect whether or not the vehicle is in motion. For example, the motion detection logic 304 operates to measure when the delivery vehicle, (or just the trailer as the case may be), is not in motion (i.e., "stopped") or when the vehicle is moving below a selectable threshold speed. For example, in one embodiment, the selectable threshold speed is ten knots. In one embodiment, the motion detection logic 304 awakes from the standby mode upon the receipt of the activate signal 328. This allows power to be saved, since detecting the vehicle motion may not performed when in the standby mode. Thus, the system operates to use power efficiently to ensure long operation when on battery power.

In one embodiment, the cargo sensing logic 302 receives instructions over-the-air from a remote station to activate and/or deactivate the motion detection logic 304. For example, in one embodiment, instructions are transmitted to the MCT aboard the vehicle and then input to the cargo sensing logic 302 via the input 314. The cargo sensing logic 302 processes the instructions to generate the activate/deactivate signal 328 to the motion detection logic 304.

In one embodiment, the motion detection logic 304 includes an antenna to receive a global positioning signal (GPS) 330 and operates to process this signal to determine an accurate position of the vehicle. The position of the vehicle is used to determine a vehicle speed. If the speed of the vehicle is below a selectable threshold speed during a selectable time interval (i.e., one hour), the motion detection logic 304 determines that the vehicle is stopped.

In one embodiment, the motion detection logic 304 includes logic to receive signals from one or more engine sensors 332, and operates to process these signals to determine a vehicle speed. For example, the engine sensors may include an ignition sensor or an RPM sensor. If the speed of the vehicle is below a selectable threshold speed during a selectable time interval (i.e., one hour), the motion detection logic 304 determines that the vehicle is stopped.

In one embodiment, the motion detection logic 302 includes logic to receive signals from one or more vehicle sensors 334, and operates to process these signals to determine that the vehicle is in motion. For example, the vehicle sensors may include a vibration sensor and/or any other type of vehicle sensor. If the signal from the selected vehicle sensor is within a selectable range, the motion detection logic 304 determines that the vehicle is stopped.

The motion detection logic 304 provides a stop indicator 318 to the cargo sensing logic 302 to indicate that the vehicle is stopped. It should be noted that any suitable type of motion detection might be used by the motion detection logic 304 to determine when the vehicle is stopped. For example, suitable sensors include any type of position sensor, motion sensor, acceleration sensor, vibration sensor, or any other type of sensor that indicates when the vehicle is stopped or moving below a threshold speed.

The message processing logic 306 may comprise a processor, CPU, gate array, hardware logic and/or discrete circuitry, software, and/or any combination of hardware and software. The message processing logic 306 is coupled to the cargo sensing logic 302 to receive a message signal 320. The message processing logic 306 operates to generate messages used during operation of the detection processor 210. In one embodiment, messages are stored directly in the message processing logic 306. In another embodiment, messages are stored in memory 308 and are sent to the message processing logic 306 via the message signal 318. In another embodiment, the memory 308 is coupled directly to message processing logic 306 and messages are accessed directly as needed. In another embodiment, the message processing logic 306 assembles specific messages from real-time information contained in the message signal 320, such as the current cargo state. Thus, the message processing logic 306 may use virtually any combination of stored and real-time information to generate various messages that are output from the detection processor 210.

During operation of the detection processor 210, the cargo sensing logic 302 can process the sensor inputs 316 to determine a cargo state at any given time. In one embodiment, the cargo sensing logic 302 determines a cargo state at regular, periodic or random intervals. In another embodiment, the cargo sensing logic 302 determines the cargo state after receiving one or more trigger events. For example, trigger events may be based on input from any type of sensor, such as a door sensor, vibration sensor, or a connection sensor that senses when the delivery portion of the vehicle is connected to a tractor portion. Virtually any type of trigger event may be used to trigger the cargo sensing logic 302 to detect the cargo state.

In one embodiment, the cargo sensing 302 operates to determine an initial cargo state when power is applied. For example, when the vehicle ignition is activated and power is applied to the detection logic 210, the cargo sensing logic 302 operates to sense the cargo state. The determined cargo state may then be further processed by storing it in the memory 308, and/or by comparing it to one or more previous cargo states stored in the memory 308. Thus, the cargo sensing logic 302 may store and track a history of cargo states to determine when cargo state changes occur.

When the cargo sensing logic 302 determines that a change in cargo state has occurred, for example, the cargo state changes from "empty" to "not-empty", the activate signal 328 is sent to the motion detection logic 304. The motion detection logic 304 then wakes up and operates to determine if the vehicle is stopped. If it is determined that the vehicle is stopped, the stop indicator 318 is sent to the cargo sensing logic 302. The cargo sensing logic 302 then stores the detected cargo state and/or state change in a memory, and may also operates to provide an indication of the state change to the vehicle operator. In another embodiment, the cargo state or stage change may be transmitted to a remote station. In one embodiment, when the cargo sensing logic 302 receives the stop indicator 318, it operates to determine the cargo state by performing various processing on the sensor input 316. For example, multiple sensor readings may be averaged to determine the actual cargo state.

In one embodiment, the motion detection logic 304 is always running so that the cargo sensing logic 302 is not required to activate the motion detection logic 304 to obtain a determination regarding the motion of the vehicle. For example, the motion detection logic 304 is always running and outputs current information on the stop indicator 318.

In one embodiment, the cargo sensing logic 302 operates to average multiple sensor reading to determine the cargo state. For example, the cargo sensing logic 302 processes input from the sensor 208 received via the sensor input 316 to determine a sensor value that indicates the state of the cargo in the delivery vehicle. The sensor input 316 may comprise digital or analog signals from one or more sensors and the cargo sensing logic 302 processes these signals to determine the sensor value. The cargo sensing logic 302 may use any suitable technique or process to determine the sensor value. The cargo sensing logic 302 then processes the sensor value to determine a cargo state that indicates whether the trailer is empty or loaded.

In one embodiment, when a cargo state change is detected, the cargo sensing logic 302 operates to generate a message signal 320. For example, when the cargo sensing logic 302 determines a cargo state change it generates a message signal containing information about the cargo state change. The message signal 320 causes the message processing logic 306 to generate one or more local alert messages 324. For example, in one embodiment, the local alert messages 324 directly control local indicators, alarms, lights, and/or other visual or audible indicators that provide an indication to the vehicle operator about the cargo state. In one embodiment, the alert messages 324 interface with existing vehicle control systems, such as a vehicle data bus, to control various vehicle indicators to alert the vehicle operator about the change in cargo state. In one embodiment, the operation of the message processing logic 306 is control by instructions included in the message signal 320. For example, the cargo sensing logic 302 includes instructions in the message signal 320 to control the operation of the message processing logic 306. In one embodiment, the instructions in the message signal 320 are derived from instructions/commands received over-the-air and input to the cargo sensing logic 302. For example, personnel at a remote station may transmit instructions to the vehicle that are processed by the cargo sensing logic 302 to control the operation of the message processing logic 306.

In one embodiment, in response to a selected message signal 320, the message processing logic 306 generates one or more cargo state messages 322 that are transmitted to a remote station via communication logic located in the delivery vehicle. For example, the cargo state messages 322 may be interfaced to an MCT located in the delivery vehicle, and the MCT transmits the message 322 to the remote station via a wireless communication system. In another embodiment, the cargo state messages 322 are input to the optional transmitter 312 that transmits the messages 326 directly to the remote station. Thus, it is possible for the cargo sensing logic 302 to detect the cargo state and control the message processing logic 306 to generate local alert messages 324 to inform the vehicle operator, and generate cargo state messages 322 to inform the remote station regarding the cargo state.

In one embodiment, the cargo state message 322 may include additional information such as time, date, or other vehicle information. For example, the sensor input 316 may include sensor data from other vehicle sensors, such as a temperature sensor, humidity sensor, or any other type of sensor. This additional information is provided by the cargo sensing logic 302 to the message processing logic 306 for inclusion in the cargo state message 322.

It should be understood that the functional elements shown in FIG. 3 are for illustrative purposes only, and that implementation of the detection logic 210 could be achieved in one of any number of ways using greater or fewer functional elements. For example, the functions of the cargo sensing logic 302, motion detection logic 304, and message processing logic 306 could all be implemented in a computer program executed by one or more processors.

Figure 4:
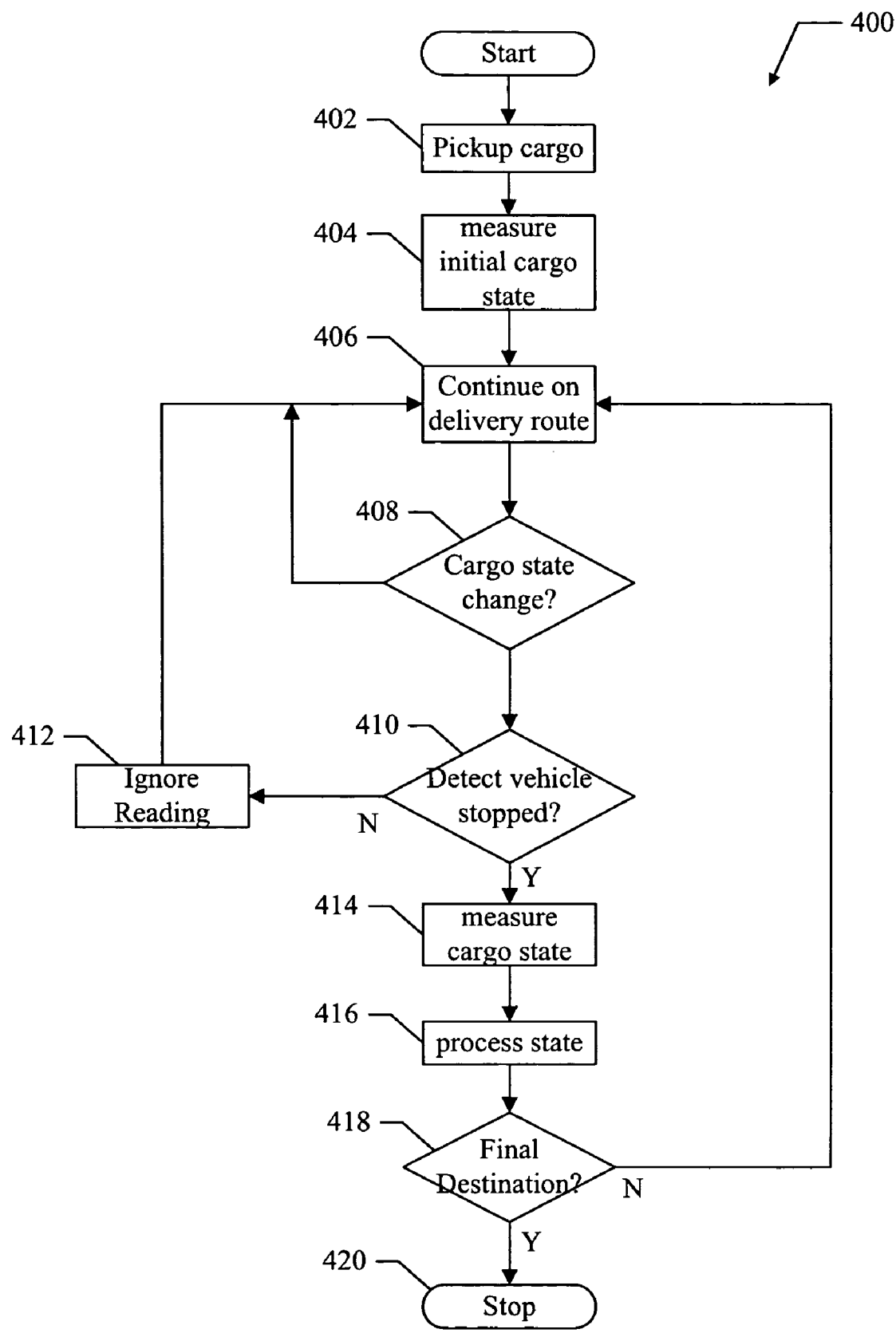
FIG. 4 shows one embodiment of a method for detecting cargo state in a delivery vehicle.

FIG. 4 shows one embodiment of a method 400 for detecting cargo state in a delivery vehicle. For example, the method 400 is suitable for use with one or more embodiments of a cargo detection system described herein. For the following description, it will be assumed that the cargo detection system comprises detection logic 210 and sensor 208 installed in a trailer portion of a delivery vehicle that is carrying cargo to be delivered to one or more delivery sites. Furthermore, it is assumed that the delivery vehicle includes communication logic to communicate with a remote station using a wireless communication system.

At block 402, the delivery vehicle arrives at a pickup location to pickup cargo to be delivered. The cargo is loaded into a trailer portion of the delivery vehicle. In one embodiment, the trailer portion includes one embodiment of a cargo detection system as described herein.

At block 404, an initial cargo state of the trailer is measured. For example, when the vehicle ignition is activated the detection logic 210 operates to obtain an initial cargo state measurement that is stored for later use. In another embodiment, the vehicle operator inputs commands to the detection logic 210 through the operator input 314 that cause the cargo sensing logic 302 to determine an initial cargo state. Additionally, the initial cargo state measurement may be stored in a memory, for example, memory 308.

At block 406, the vehicle continues on its delivery route to deliver the cargo.

At block 408, a test is performed to determine if a cargo state change has occurred. For example, the cargo sensing logic 302 operates to sense a cargo state and compare the detected state to one or more stored values. If the newly detected state is different from the stored values, a cargo state change is detected. When a cargo state change is detected, the method proceeds to block 410. If no cargo state change is detected the method proceeds to back to block 406.

At block 410, a test is performed to determine whether or not the vehicle is in motion. For example, the motion detection logic 304 operates to determine if the vehicle is stopped using a received GPS signal as described above. If it is determined that the vehicle is stopped or moving slower than a threshold speed, then the motion detection logic 304 indicates this to the cargo sensing logic 302 via the stop indicator 318. It should be noted that any suitable vehicle motion determination technique may be used to determine if the vehicle is stopped or moving below a threshold speed. If the vehicle is moving above a threshold speed, the method proceeds to block 412. If the motion detection logic 304 determines that the vehicle is stopped or moving below the threshold speed, the method proceeds to block 414.

At block 412, the cargo state reading is ignored. For example, because it was determined that the vehicle is moving about the threshold speed, the cargo sensing logic 302 ignores the cargo state reading. The method then proceeds to block 406.

At block 414, a detailed measurement of the cargo state is obtained when it is determined that the vehicle is stopped or moving below the threshold speed. In one embodiment, the cargo sensing logic 302 operates to measure the cargo state using sensor signals received at the sensor input 316. For example, the cargo sensing logic 302 operates to take multiple sensor readings to verify the detected cargo state change. In one embodiment, the determined cargo state change is stored in a memory for further processing.

At block 416, the determined cargo state is processed. For example, in one embodiment, the cargo state is displayed to the vehicle operator. In another embodiment, the cargo state is transmitted to a remote station for further processing or evaluation. For example, the cargo sensing logic 302 includes cargo state information in a message signal 320 that is sent to the message processing logic 306. The message processing logic operates to generate local alert messages 324 and/or cargo state messages 322 that are transmitted to a remote station.

At block 418, a test is performed to determine if the vehicle has reached its final destination. If the vehicle has not reached its final destination, then the method proceeds to block 406. If the vehicle has reached its final destination, then the method ends at block 420.

It should be understood that the method 400 is provided for illustrative purposes only, and that additions, deletions, combinations, or rearrangement of the method steps may be made without deviating from the scope of the described embodiments.

Therefore, a cargo detection system for detecting the state of cargo in a delivery vehicle is described herein. Accordingly, while one or more embodiments have been illustrated and described, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

The invention claimed is:

1. A method for determining a cargo state in a delivery vehicle, the method comprising:
   sensing a cargo state change;
   determining whether or not the delivery vehicle is in motion; and
   storing the cargo state change if it is determined that the delivery vehicle is not in motion.

2. The method of claim 1, further comprising ignoring the cargo state change if it is determined that the delivery vehicle is in motion.

3. The method of claim 1, further comprising providing an indicator of the cargo state change.

4. The method of claim 1, further comprising transmitting an indicator of the cargo state change to a remote station.

5. The method of claim 1, wherein the step of determining comprises determining that the vehicle is not in motion if it is traveling slower than a selected threshold speed.

6. The method of claim 1, wherein the step of determining comprises determining whether or not the delivery vehicle is in motion by processing a GPS signal.

7. The method of claim 1, wherein the step of determining comprises determining whether or not the delivery vehicle is in motion by processing an engine sensor signal.

8. The method of claim 1, wherein the step of determining comprises determining whether or not the delivery vehicle is in motion by processing a vibration sensor signal.

9. The method of claim 1, wherein the step of sensing comprises periodically sensing a cargo state to sense the cargo state change.

10. The method of claim 1, wherein the step of sensing comprises sensing the cargo state change in response to a trigger event.

11. The method of claim 1, wherein the step of sensing comprises sensing the cargo state change using an ultrasonic sensor.

12. A cargo state detection system for detecting a cargo state in a vehicle, the system comprising:
    a sensor that operates to sense cargo in the vehicle and output a sensor signal;
    motion detection logic that operates to determine whether or not the vehicle is in motion; and
    cargo sensing logic that operates to sense a cargo state change based on the sensor signal, and store the cargo state change if the motion detection logic determines that the vehicle is in motion.

13. The system of claim 12, wherein the cargo sensing logic operates to ignore the cargo state change if it is determined that the vehicle is in motion.

14. The system of claim 12, further comprising messaging logic that operates to provide an indicator of the cargo state change.

15. The system of claim 12, further comprising messaging logic that operates to transmit an indicator of the cargo state change to a remote station.

16. The system of claim 12, wherein the motion detection logic comprises logic that operates to determine that the vehicle is not in motion if it is traveling slower than a selected threshold speed.

17. The system of claim 12, wherein the motion detection logic comprises logic that operates to determine whether or not the delivery vehicle is in motion by processing a GPS signal.

18. The system of claim 12, wherein the motion detection logic comprises logic that operates to determine whether or not the delivery vehicle is in motion by processing an engine sensor signal.

19. The system of claim 12, wherein the motion detection logic comprises logic that operates to determine whether or not the delivery vehicle is in motion by processing a vibration sensor signal.

20. The system of claim 12, wherein the cargo sensing logic operates to periodically sense a cargo state change based on the sensor signal.

21. The system of claim 12, wherein the cargo sensing logic operates to sense the cargo state change in response to a trigger event.

22. The system of claim 12, wherein the sensor is an ultrasonic sensor.

23. Apparatus for determining a cargo state in a delivery vehicle, the apparatus comprising:
    means sensing a cargo state change;
    means for determining whether or not the delivery vehicle is in motion; and
    means for storing the cargo state change if it is determined that the delivery vehicle is not in motion.

24. The apparatus of claim 23, further comprising means for ignoring the cargo state change if it is determined that the delivery vehicle is in motion.

25. The apparatus of claim 23, further comprising means for providing an indicator of the cargo state change.

26. The apparatus of claim 23, further comprising means for transmitting an indicator of the cargo state change to a remote station.

27. The apparatus of claim 23, wherein the means for determining comprises means for determining that the vehicle is not in motion if it is traveling slower than a selected threshold speed.

28. The apparatus of claim 23, wherein the means for determining comprises means for determining whether or not the delivery vehicle is in motion by processing a GPS signal.

29. The apparatus of claim 23, wherein the means for determining comprises means for determining whether or not the delivery vehicle is in motion by processing an engine sensor signal.

30. The apparatus of claim 23, wherein the means for determining comprises means for determining whether or not the delivery vehicle is in motion by processing a vibration sensor signal.

31. The apparatus of claim 23, wherein the means for sensing comprises means for periodically sensing a cargo state to sense the cargo state change.

32. The apparatus of claim 23, wherein the means for sensing comprises means for sensing the cargo state change in response to a trigger event.

33. The apparatus of claim 24, wherein the means for sensing comprises means for sensing the cargo state change using an ultrasonic sensor.

* * * * *